Mar. 20, 1923.
J. G. HARROLD.
DELIVERY APPARATUS.
FILED OCT. 6, 1921.
1,449,283.
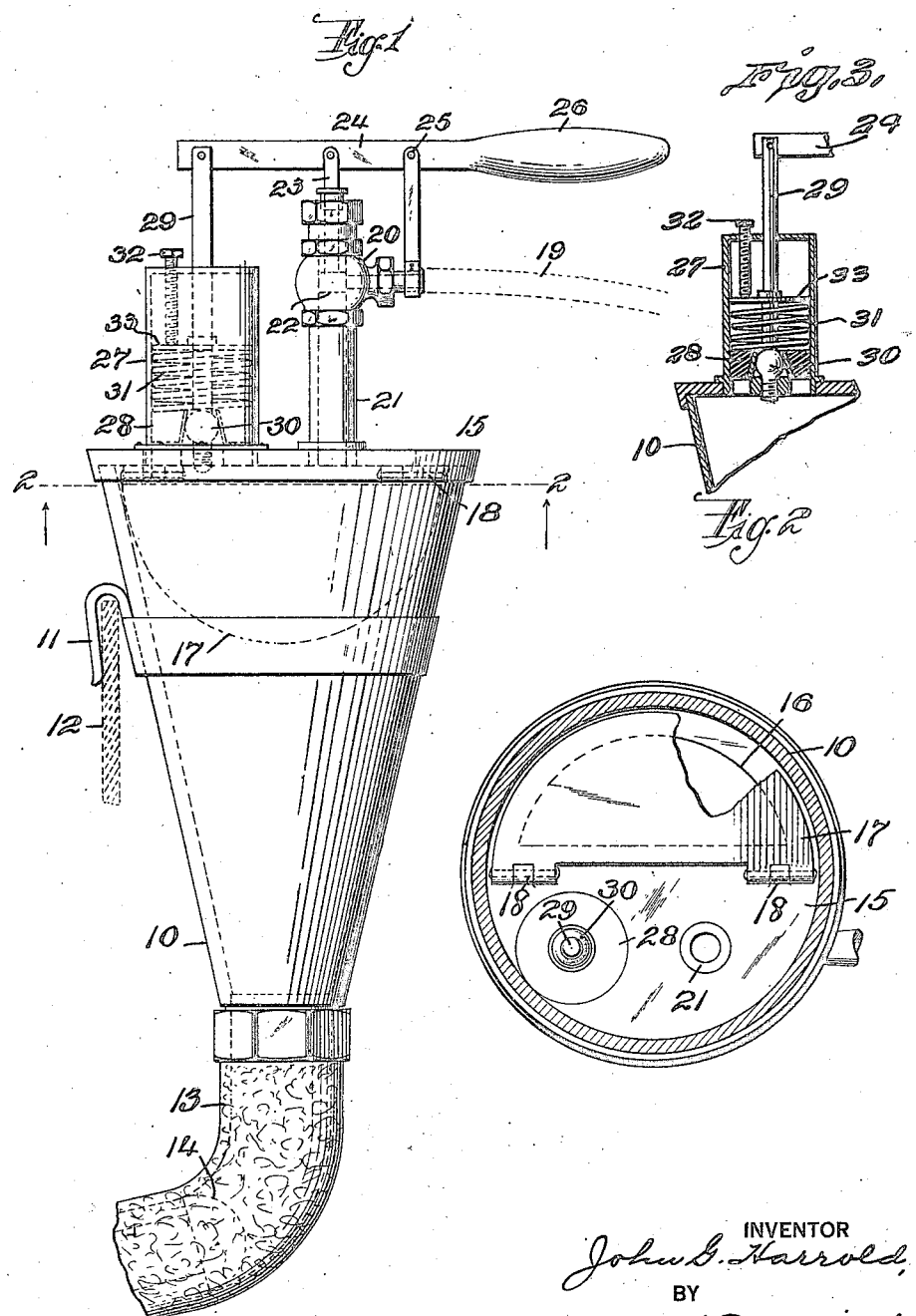
INVENTOR
John G. Harrold,
BY
Wm. H. Caulfield,
ATTORNEY Patented Mar. 20, 1923.

1,449,283

UNITED STATES PATENT OFFICE.

JOHN G. HARROLD, OF NEWARK, NEW JERSEY.

DELIVERY APPARATUS.

Application filed October 6, 1921. Serial No. 505,734.

*To all whom it may concern:*

Be it known that I, JOHN G. HARROLD, a citizen of the United States, and a resident of Newark, county of Essex, and State of New Jersey, have invented certain new and useful Improvements in Delivery Apparatus, of which the following is a specification.

This invention relates to an apparatus for delivering articles to distant points, and while its uses may be varied to suit circumstances, it is particularly devised for use on steel structural work and in ship building for delivering hot rivets from the forge where they are heated to the place where they are to be inserted in the structure, so that they are delivered quickly and are thus delivered very hot.

The invention is designed to provide an apparatus of this kind in which, after the rivet is delivered to it, a handle is operated which admits air, the air in turn closing the receptacle in which the rivet was deposited and forcing the rivet through to its destination, and when the rivet is delivered this fact is indicated by reason of the receptacle opening to receive another rivet.

The invention is illustrated in the accompanying drawing, in which Figure 1 is a side view of an apparatus made according to my invention, and Figure 2 is a section taken on line 2—2 in Figure 1, this view illustrating the door of the receptacle shut. Fig. 3 is a detail view of parts shown in Figs. 1 and 2.

The receptacle can be of any desired form, but is usually hopper-like or in the shape of a funnel and is shown at 10, and it is adapted to be secured in any suitable way in juxtaposition to the forge in which the rivets are heated, the form of the device having shown a hook 11 which is adapted to be caught over the edge 12 of the forge. At the bottom of the receptacle is a delivery pipe 13 which is of a size to transmit the article to be delivered and allowing a small clearance for the travel of the article. The drawing shows a pipe with a rivet, the head 14 of which nearly closes the pipe so that air under pressure will positively push the rivet through. In case of rivet work the ordinary commercial asbestos-lined hose is used as a delivery pipe.

At a suitable point, preferably in the top 15 of the receptacle, is an opening 16 which has a door which opens inwardly, and I show a loosely swinging door 17 hinged at 18 and swinging loosely so as to normally hang down, as in Figure 1, when there is no pressure in the receptacle, and which easily swings shut when pressure is present.

An air pipe 19 delivers air under pressure to the receptacle through a suitable air inlet device usually mounted on the top 15, said inlet device including a valve casing 20 mounted on a nipple 21 and having a valve 22 therein actuated by a stem 23. The stem is connected to a lever 24 pivoted at 25 and having a handle 26.

I also provide a means for controlling the air valve and which means also shuts off the air when the article has been delivered from the pipe 13. The means comprises a chamber or casing 27 which opens into the receptacle and is provided with a piston 28 connected by a piston rod 29 with the lever 24. The ball 30 forms a convenient and simple rocking connection between the piston and the piston rod. The spring 31 yieldingly holds the piston normally down, and the spring may be adjusted, and consequently the opening of the valve may be regulated, as by a screw 32 against which the spring abuts through the medium of the backing plate 33.

The operation of the device is as follows:

With the parts disposed as in Figure 1, the receptacle is open and the air is shut off. The boy at the forge drops a rivet through the opening 16 and the rivet drops to the position at 14 in Figure 1. The swinging handle 26 is then pushed down, which opens the valve 22 and air under pressure from the pipe 19 enters the receptacle and slams the door 17 shut and the air under pressure then pushes the rivet through the delivery pipe. When the valve 22 was opened the piston 28 was moved up thereby compressing the spring 31 and the piston is held up by air pressure within the receptacle as soon as the door 17 is shut.

When the rivet emerges from the pipe 13 this channel is open for air under pressure and this causes such a reduction of pressure within the receptacle that the spring 31 pushes the piston 28 down, and consequently the lever 24, and this in turn shuts the valve 22. The air is now entirely shut off. The door 17 is also open, since it drops down when the air pressure is released by the emerging of the rivet from the delivery pipe, and is a signal to the boy at the forge that the rivet is delivered and another can be deposited in the receptacle.

A failure of the door to open shows that there is a stoppage in the pipe and thus prevents the placing of more than one rivet in the pipe.

The receptacle is, to all intents and purposes, an enlargement of the delivery pipe and is preferably made hopper-like to provide a larger opening to facilitate the delivery of articles to the pipe. The device permits the retention of heat in the rivet, even though it is delivered to a point distant from the forge, and is particularly applicable to large steel structures in building operations and also in ship-yard work, permitting the installation of the forge on an upper deck and delivering rivets to various points in the boat, particularly to the work near the keel, where, when forges are installed at these low points, the fumes from the forge make it uncomfortable and sometimes dangerous for the workmen employed there.

It will be understood that changes can be made in the proportions and arrangement of the parts without departing from the scope of the invention.

I claim:

1. A delivery apparatus comprising a receptacle having a delivery pipe adapted to receive and transmit a rivet that approximately fits the pipe without the use of a carrier, an air inlet valve, manually operated means for opening the valve, retaining means operable by pressure from within the receptacle for holding the valve open, and a door on the receptacle normally open and arranged to be closed automatically by pressure from within the receptacle.

2. A rivet delivery apparatus comprising a receptacle having a rivet-receiving door normally open, an air inlet valve normally closed, a delivery pipe adapted to successively transmit rivets of a size to substantially fill the pipe, and means for opening the valve, to admit air whereby each rivet is propelled and the door is shut by the pressure of air admitted, the door being arranged to return automatically to its normal open position after each rivet is discharged from the pipe.

3. A delivery apparatus comprising a receptacle adapted to receive hot rivets having an inwardly opening door, a manually operable air inlet means adjacent the door, whereby air is admitted under pressure in the receptacle to keep the door shut while an article to be delivered is still in the delivery means, a flexible pipe for transmitting hot rivets and means for automatically closing said air inlet means when the rivet leaves the pipe.

4. A delivery apparatus comprising a hopper-like receptacle, a delivery pipe extending from the bottom of said receptacle, adapted to transmit rivets which approximately fit the pipe, a swinging door opening inwardly on said receptacle and adapted to be closed by pressure in the receptacle, an air inlet means on said receptacle, manually operated means for said inlet means, and air-operated means for holding said inlet means open until the rivet leaves the pipe and means for automatically closing said air inlet means after the rivet leaves the pipe.

5. A delivery apparatus comprising a hopper-like receptacle, a delivery pipe on said receptacle, a door in said receptacle and opening inwardly, an air inlet means, a yielding means for normally holding the inlet means shut, and means operable by air under pressure in the receptacle for opening the air inlet means against the force exerted by said yielding means.

6. A delivery apparatus comprising a hopper-like receptacle, a delivery pipe on said receptacle, a door in said receptacle and opening inwardly, an air inlet means including a manually operable valve, a swinging handle on the valve, a chamber having an end opening in the receptacle, a piston in said chamber, a spring beyond the piston, and a connection from the piston to the handle.

7. A delivery apparatus comprising a hopper-like receptacle, a delivery pipe on said receptacle, a door in said receptacle and opening inwardly, an air inlet means including a manually operable valve, a swinging handle on the valve, a chamber having an end opening in the receptacle, a piston in said chamber, a spring beyond the piston, means for adjusting the spring, and a connection from the piston to the handle.

In testimony that I claim the foregoing, I have hereto set my hand, this 4th day of October, 1921.

JOHN G. HARROLD.